US011525574B2

(12) United States Patent
Civitarese

(10) Patent No.: US 11,525,574 B2
(45) Date of Patent: Dec. 13, 2022

(54) SINGLE INLET OXYGEN BURNER FOR METAL MAKING

(71) Applicant: Berry Metal Company, Harmony, PA (US)

(72) Inventor: Vincent J. Civitarese, Butler, PA (US)

(73) Assignee: Berry Metal Company, Harmony, PA (US)

(*) Notice: Subject to any disclaimer, the term of this patent is extended or adjusted under 35 U.S.C. 154(b) by 70 days.

(21) Appl. No.: 17/348,520

(22) Filed: Jun. 15, 2021

(65) Prior Publication Data
US 2021/0388984 A1 Dec. 16, 2021

Related U.S. Application Data

(60) Provisional application No. 63/039,732, filed on Jun. 16, 2020.

(51) Int. Cl.
F23N 1/00 (2006.01)
F23D 14/46 (2006.01)

(52) U.S. Cl.
CPC .............. F23N 1/007 (2013.01); F23D 14/46 (2013.01); F23D 2206/0015 (2013.01); F23N 2235/02 (2020.01); F23N 2239/04 (2020.01)

(58) Field of Classification Search
CPC ... F23N 3/02; F23N 3/07; F23N 1/007; F23N 2239/04; F23N 2235/02; F23D 14/22; F23D 14/46; F23D 2206/0015
USPC ..................................... 431/2, 181, 182, 354
See application file for complete search history.

(56) References Cited

U.S. PATENT DOCUMENTS

| 4,602,571 A * | 7/1986 | Chadshay | ............... F23D 1/005 239/417 |
| 2010/0065135 A1 | 3/2010 | Rub | |
| 2016/0237522 A1 * | 8/2016 | Zhou | .................. C22B 15/0028 |

FOREIGN PATENT DOCUMENTS

FR 2488366 2/1982

OTHER PUBLICATIONS

International Search Report and Written Opinion dated Sep. 24, 2021 from the International Searching Authority for PCT/US21/37477.

* cited by examiner

Primary Examiner — Vivek K Shirsat
(74) Attorney, Agent, or Firm — Clark Hill PLC

(57) ABSTRACT

The present disclosure describes a metal making burner in fluid communication with a gas inlet and comprising an oxygen inlet valve that provides control of oxygen flow to two different discharge lines, such as a main line and a shroud line. This allows distinct "modes" of operation, utilizing only the flow from the single oxygen supply as the control method. The apparatus includes a moving piston with ports therein that meter flow to both discharge lines when the ports line up with a separate set of ports in a cylinder that receives the piston. At low or no pressure from the gas inlet, flow rates follow one ratio of flows between the discharge lines. As pressure from a gas inlet changes in the burner, the piston moves and realigns the ports (opening or closing some of the ports), which results in a different ratio of flows between the discharge lines.

18 Claims, 8 Drawing Sheets

SINGLE INLET OXYGEN BURNER FOR METAL MAKING

BACKGROUND OF THE DISCLOSURE

1. Cross Reference to Related Applications

This application claims the priority benefit of U.S. Provisional Patent Application No. 63/039,732 filed in the Unites States Patent and Trademark Office on Jun. 16, 2020.

2. FIELD OF THE DISCLOSURE

The present disclosure relates to burners for furnaces, and, in particular, oxygen burners for metal making in electric arc furnaces.

3. Description of the Related Art

Electric Arc Furnaces (EAFs) have been used since the $19^{th}$ century for making metals. Burners inside of the furnace provide heat to melt metals. Burners use both oxygen and fuel gas for combustion in the furnace. During operation, the oxygen performs two functions in these burners through two discharge lines, called a shroud and a main, which each have their own individual passages/ports. Some oxygen systems supply a supply line to the shroud and another supply line to the main, which allows for the flow of oxygen to be varied between the shroud and the main. This variation allows a single burner to produce a scrap metal flame (low oxygen flow) and a decarburizing flame (high oxygen flow) for flat bath operations. However, some oxygen systems only provide a single oxygen line for each burner. In those instances, the flow from that supply line must be split between the shroud and the main making it difficult to vary the flow of either the shroud or the main relative to the other.

Some single inlet oxygen burners include an adjustment on a single leg (shroud or main) of its oxygen discharge. For these burners, a poppet style valve opens or closes to restrict the flow to the shroud side of the burner. This allows partial control of the oxygen flow, but only through one side.

A shortcoming of some prior art single line oxygen burners is that burner operation can only be controlled by varying the flow through the single line, and, thus, the flow through the shroud and the main are varied in equal proportion. Another shortcoming for other single line oxygen burners is that control was only possible on one discharge line. This lack of independent control of the flow rates on both the main and shroud lines prevents the furnace from operating optimally.

What is needed is a single inlet oxygen burner that can operate in multiple modes, where the flow of oxygen can be varied between the shroud and main when there is only one oxygen line into the burner.

BRIEF SUMMARY OF THE DISCLOSURE

The present disclosure is related to a burner for supplying heat, and, in particular, an oxygen burner for metal making.

One embodiment according to the present disclosure includes a burner apparatus, the apparatus including: a tubular body having a first end and second end; a first oxygen circuit disposed inside of the tubular body with an outlet at the first end; a second oxygen circuit attached to the outside of the tubular body, where the tubular body includes openings to connect with the second oxygen circuit; a valve disposed in the tubular body proximate to the second end. The valve includes a hollow piston, a cylinder, and a spring. The hollow piston has a piston wall, with a first end and a second end, and an end cap connected to the first end of the piston wall. The piston wall has a plurality of piston ports. The cylinder is configured to receive the hollow piston. The cylinder includes a plurality of cylinder ports that are aligned with an inlet of the first oxygen circuit and the second oxygen circuit. The spring is in physical communication with the hollow piston and the tubular body. The spring is responsive to oxygen pressure applied at the second end to the hollow piston. When the hollow piston is positioned at different points within the cylinder, one or more of the piston ports align with one or more of the cylinder ports. The plurality of piston ports may include one or more ports configured to align with the first oxygen circuit and one or more ports configured to align with the second oxygen circuit. The combined cross-sectional area of the one or more ports configured to align with the first oxygen circuit is equal to a combined cross-sectional area of the one or more ports configured to align with the second oxygen circuit. The one or more ports configured to align with the second oxygen circuit may include two or more ports of equal cross-sectional area. The tubular body may include a restraint member disposed on the inside; and the piston wall may include a channel configured to receive the restraint member such that the restraint member limits the travel of the piston wall to a selected distance from the second end.

Another embodiment according to the present disclosure includes a method of controlling oxygen pressure in a burner apparatus, the burner including: a tubular body having a first end and second end; a first oxygen circuit disposed inside of the tubular body with an outlet at the first end; a second oxygen circuit attached to the outside of the tubular body, where the tubular body includes openings to connect with the second oxygen circuit. The valve includes a hollow piston, a cylinder, and a spring. The hollow piston has a piston wall, with a first end and a second end, and an end cap connected to the first end of the piston wall. The piston wall has a plurality of piston ports. The cylinder is configured to receive the hollow piston. The cylinder includes a plurality of cylinder ports that are aligned with an inlet of the first oxygen circuit and the second oxygen circuit. The spring is in physical communication with the hollow piston and the tubular body. The spring is responsive to oxygen pressure applied at the second end to the hollow piston. When the hollow piston is positioned at different points within the cylinder, one or more of the piston ports align with one or more of the cylinder ports. The method includes the steps of: applying oxygen to the valve at a first pressure where the hollow piston is in a first position associated with a first ratio between an output flow from the first oxygen circuit and an output flow form the second oxygen circuit; and changing the first pressure to a second pressure causing the hollow piston to move to a second position associated with a second ratio between the output flow from the first oxygen circuit and the output flow form the second oxygen circuit. The first ratio may be 50:50, and the first pressure may be 10 psi (69 kPa) or less. The second ratio may be 90:10, and the second pressure may be 25 psi (172 kPa) or greater. The first position may be about 2 inches (5.1 cm) from the second position.

Examples of the more important features of the disclosure have been summarized rather broadly in order that the detailed description thereof that follows may be better understood and in order that the contributions they represent to the art may be appreciated. There are, of course, additional features of the disclosure that will be described hereinafter and which will form the subject of the claims appended hereto.

BRIEF DESCRIPTION OF THE DRAWINGS

For a detailed understanding of the present disclosure, reference should be made to the following detailed description of the embodiments, taken in conjunction with the accompanying drawings, in which like elements have been given like numerals, wherein.

DETAILED DESCRIPTION OF THE DISCLOSURE

Figure 1:
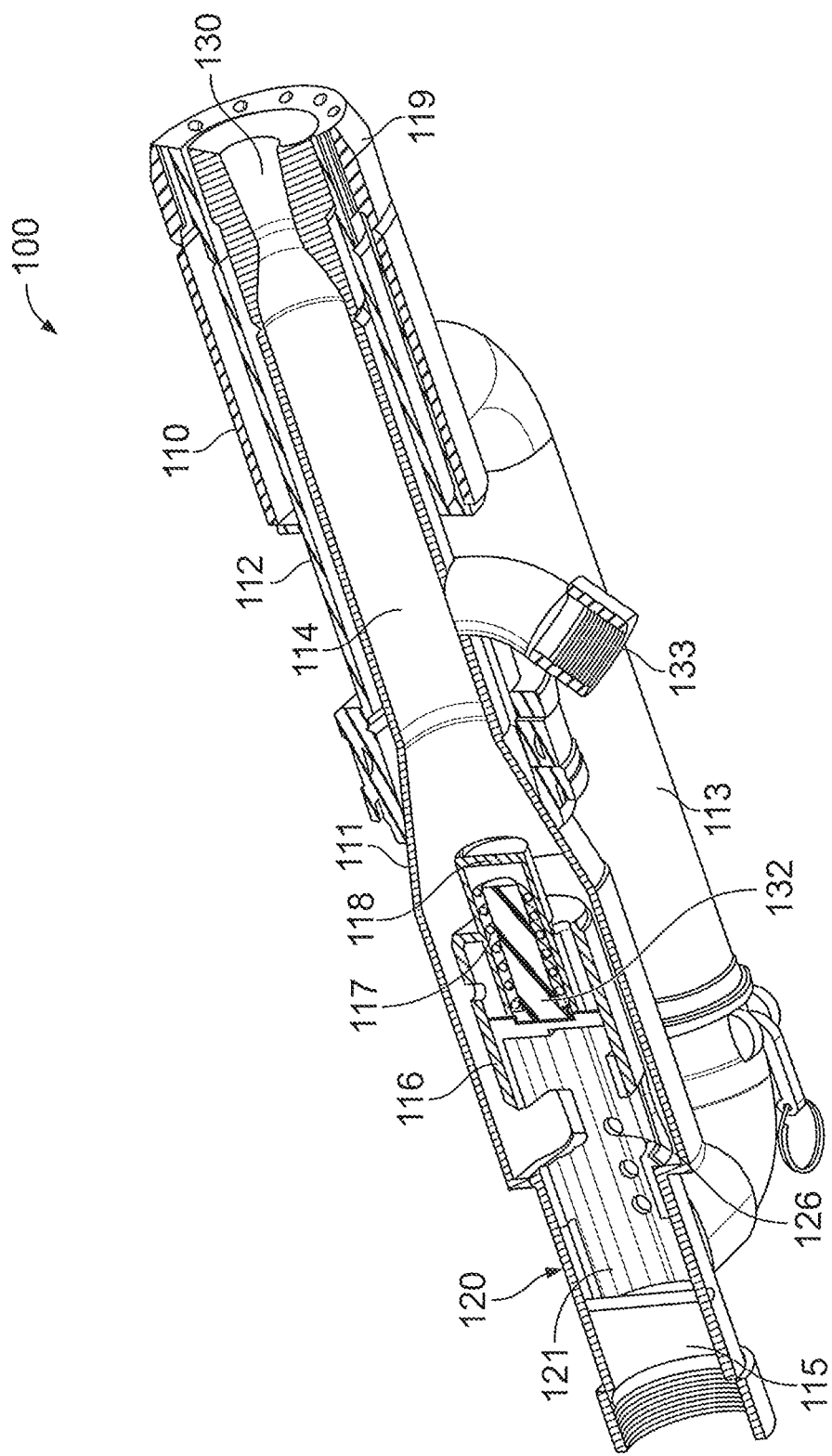
FIG. 1 is a substantially cross-sectional diagram of a single inlet oxygen burner according to one embodiment of the present disclosure.

Generally, the present disclosure relates to apparatuses for applying heat in a furnace, and, in particular, oxygen burners for electric arc furnaces. The present disclosure is susceptible to embodiments of different forms. They are shown in the drawings, and herein will be described in detail, specific embodiments of the present disclosure with the understanding that the present disclosure is to be considered an exemplification of the principles of the present disclosure and is not intended to limit the present disclosure to that illustrated and described herein.

FIG. 1 shows an inlet oxygen burner apparatus 100 according the one embodiment of the present disclosure. The inlet oxygen burner apparatus 100 may include a burner assembly 110 with a set of outlets 119 that connects to a tubular body 111 that houses a main oxygen circuit 112 a main oxygen supply tube 114, and a main oxygen nozzle 130. In some embodiments, the main oxygen nozzle 130 may be a de Laval nozzle. A shroud oxygen circuit 113 is disposed adjacent to the tubular body 111. The main oxygen circuit 112 and the shroud oxygen circuit 113 both receive oxygen through the main oxygen inlet 115. The amount of oxygen in each oxygen circuit 112, 113 is adjusted by the action of a valve 120. The valve 120 includes a cylinder 116 and a hollow piston 121. The hollow piston 121 configured to fit within a cylinder 116, and the cylinder 116 includes at least one opening 125 (see FIG. 2A) for the main oxygen circuit 112 and at least one opening 126 for the shroud oxygen circuit 113. A gas tube 133 is connected to the tubular body 111 to provide fuel to the oxygen burner apparatus 100.

As further shown in FIGS. 2A-2E, the hollow piston 121 has a hollow piston body or piston wall 122 that defines a main oxygen opening or port 125 that can be aligned with a main oxygen circuit opening 129 (see FIG. 2C) for the main oxygen circuit 112 in the cylinder 116 and multiple openings or ports 126 that can be aligned with a shroud oxygen circuit opening 131 in the cylinder 116 for the shroud oxygen circuit 113. The piston 121 includes a piston cap 123 on a first end and an open end 124 on a second opposite end. The piston cap 123 is positioned at one end of a biasing member such as a compression spring 117 that is secured in a spring housing 118 opposite the main oxygen inlet 115. A spindle 132 may be connected to the piston cap 123 and inserted into the compression spring 117. The piston 121 and cylinder 116 are configured to permit travel of the piston 121 for a defined stroke. In one exemplary embodiment, the defined stroke may be 2 inches (5.1 cm).

Figure 2A:
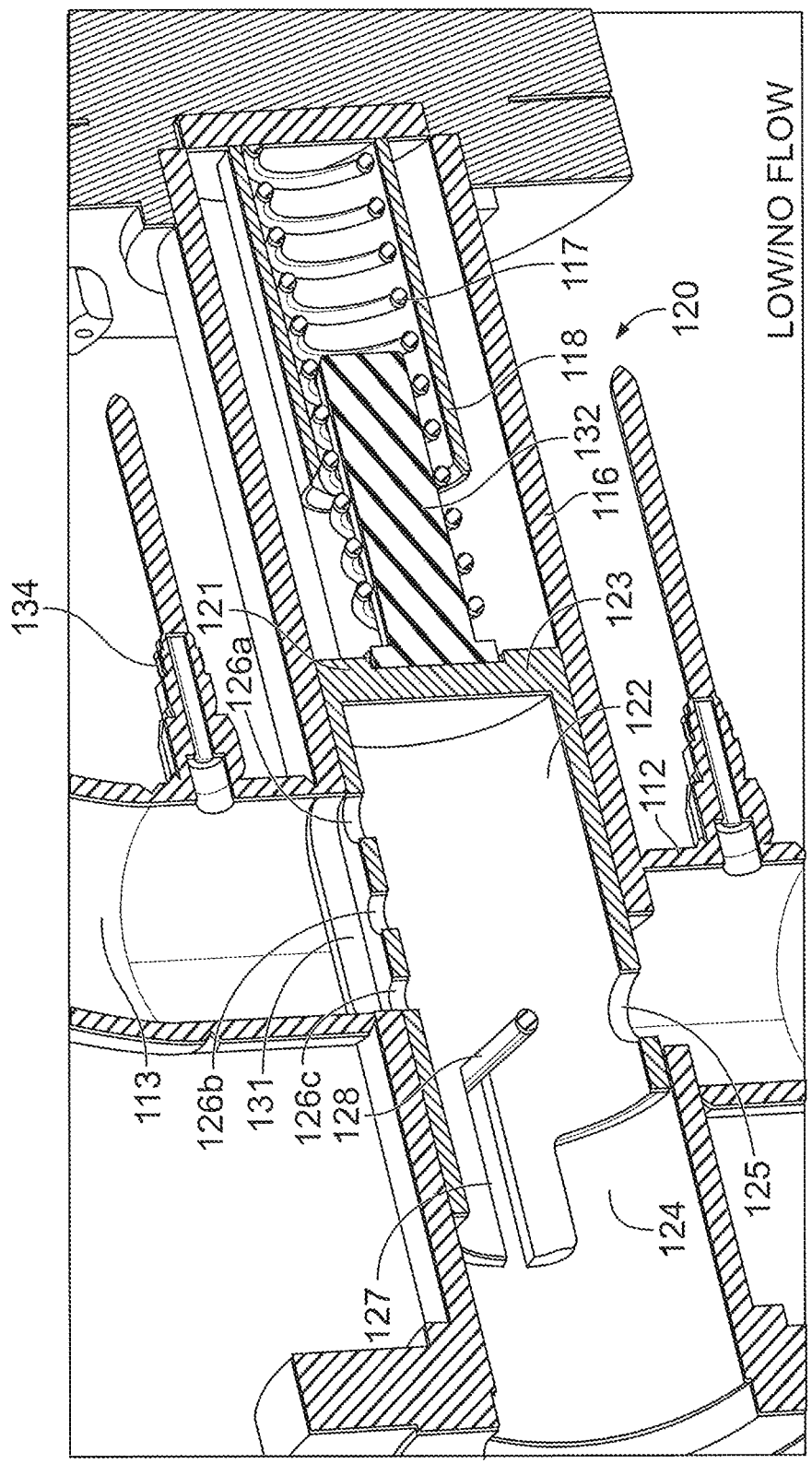
FIG. 2A is a cross-sectional diagram of a valve in the burner of FIG. 1 when the oxygen pressure is below about 10 psi (69 kPa)

The movement of the piston 121 relative to the cylinder 116 changes the number of ports 125, 126 that are in alignment with the oxygen circuits 112, 113, thus, the oxygen supply provided to the oxygen circuits 112, 113 is dependent on inlet oxygen pressure. Based on the positions of the ports 125, 126, the flow percentages to the oxygen circuits 112, 113 can emphasize flow in the main oxygen circuit 112 at some pressures while emphasizing flow in the shroud oxygen circuit 113 at other pressures. For example, at low flow the main oxygen circuit 112 to shroud oxygen circuit 113 flow ratio may be 50%:50% as shown in FIG. 2A, while main oxygen circuit 112 to shroud oxygen circuit 113 flow ratio may be 90%:10% at high flow, as shown in FIG. 2E. These examples are illustrative; however, it is contemplated that suitable operating ratios maybe by used with the valve 120 by adjusting the size, shape, number, and/or position of the ports 125, 126. In some embodiments, the valve 120 can be installed upstream of the burner assembly 110 in a separate housing rather than being directly connected to the burner assembly 110.

FIG. 2A shows a close-up diagram of a section of FIG. 1 where the valve 120 is in a low flow or no flow configuration (i.e., low or no pressure from the oxygen inlet 115). The compression spring 117 is shown fully extended, as there is little or no flow of oxygen to push against the piston cap 123 in order to compress the spring 117 into the spring housing 118. Thus, the piston 121 is held in position substantially or completely by spring pressure. The multiple shroud ports 126 are shown individually as a first port 126a, a second port 126b, and a third port 126c. The shroud ports 126a, 126b, 126c are shown as circular and uniform in size; however, this is exemplary and illustrative only. In some embodiments, the multiple ports 126 may be different sizes, shapes, or have nonuniform spacing. In some embodiments, there may be more or fewer shroud ports 126 than three. The piston 121 may include a channel 127 that is longitudinal in the direction of travel of the piston 121 relative to the cylinder 116 and configured to receive a piston restraint 128 extending from the inside of the cylinder 116. The piston restraint 128 prevents movement of the piston 121 out of the cylinder 116 and guides its movement through the cylinder 116 with its interaction with the channel 127.

In the no flow/low flow position, the shroud ports 126a, 126b, 126c are aligned with the opening 131 for the shroud oxygen circuit 113 and the main oxygen port 125 is aligned with the opening 129 for the main oxygen circuit 112. The piston 121 is held in position solely by pressure from the compression spring 117 being exerted on the piston cap 123. In some embodiments, the cross-sectional area of the main oxygen port 125 and the combined cross-sectional areas of the shroud ports 126 are about the same, thus there is approximately equal flow of oxygen into the main oxygen circuit 112 and the shroud oxygen circuit 113 in this configuration. In some embodiments, the cross-sectional area of the ports 125, 126 may be selected based on the cross-sectional area of the set of burner outlets 119. The main oxygen circuit 112 and the shroud oxygen circuit 113 may each have a check valve 134 to vent oxygen if needed.

Figure 2B:
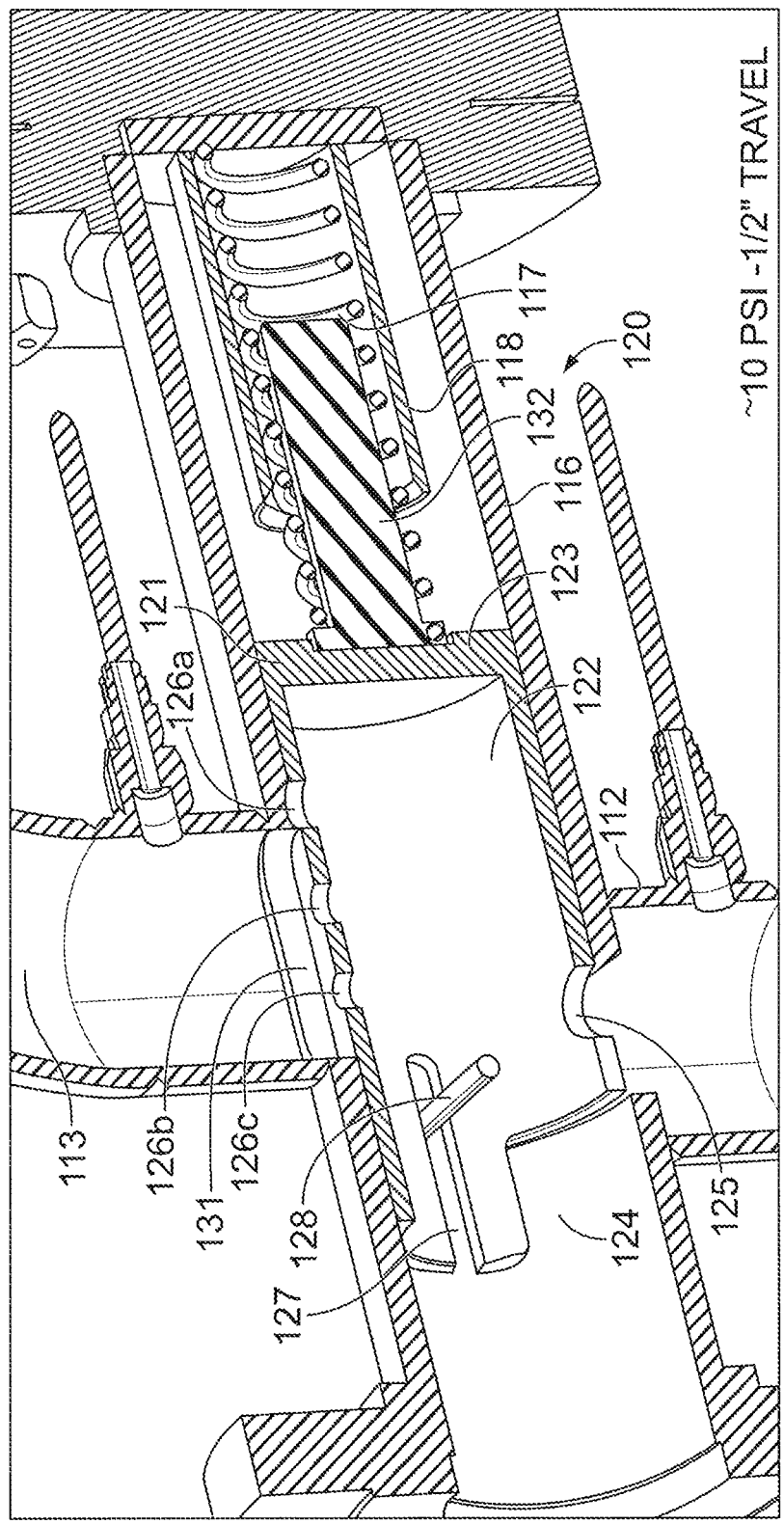
FIG. 2B is a cross-sectional diagram of a valve in the burner of FIG. 1 when the oxygen pressure is about 10 psi (69 kPa)

FIG. 2B shows a close-up diagram of the apparatus 100 when the oxygen pressure from the oxygen inlet 115 has increased to about 10 psi (69 kPa). The oxygen pressure on the piston 121 not only pushes against the piston cap 123 but also causes the piston 121 to move against the compression spring 117 and shifts the positions of the ports 125, 126 in the piston wall 122 relative to the openings in the cylinder 116. In this exemplary and illustrative embodiment, the pressure has induced the piston 121 to move about ½ inch (1.3 cm). In other embodiments, the different pressures and degrees of movement may be used. As shown, the second shroud port 126b and the third shroud port 126c remain aligned with the opening for the shroud oxygen circuit 113; however, the first shroud port 126a is partially blocked by the wall of the cylinder 116.

Figure 2C:
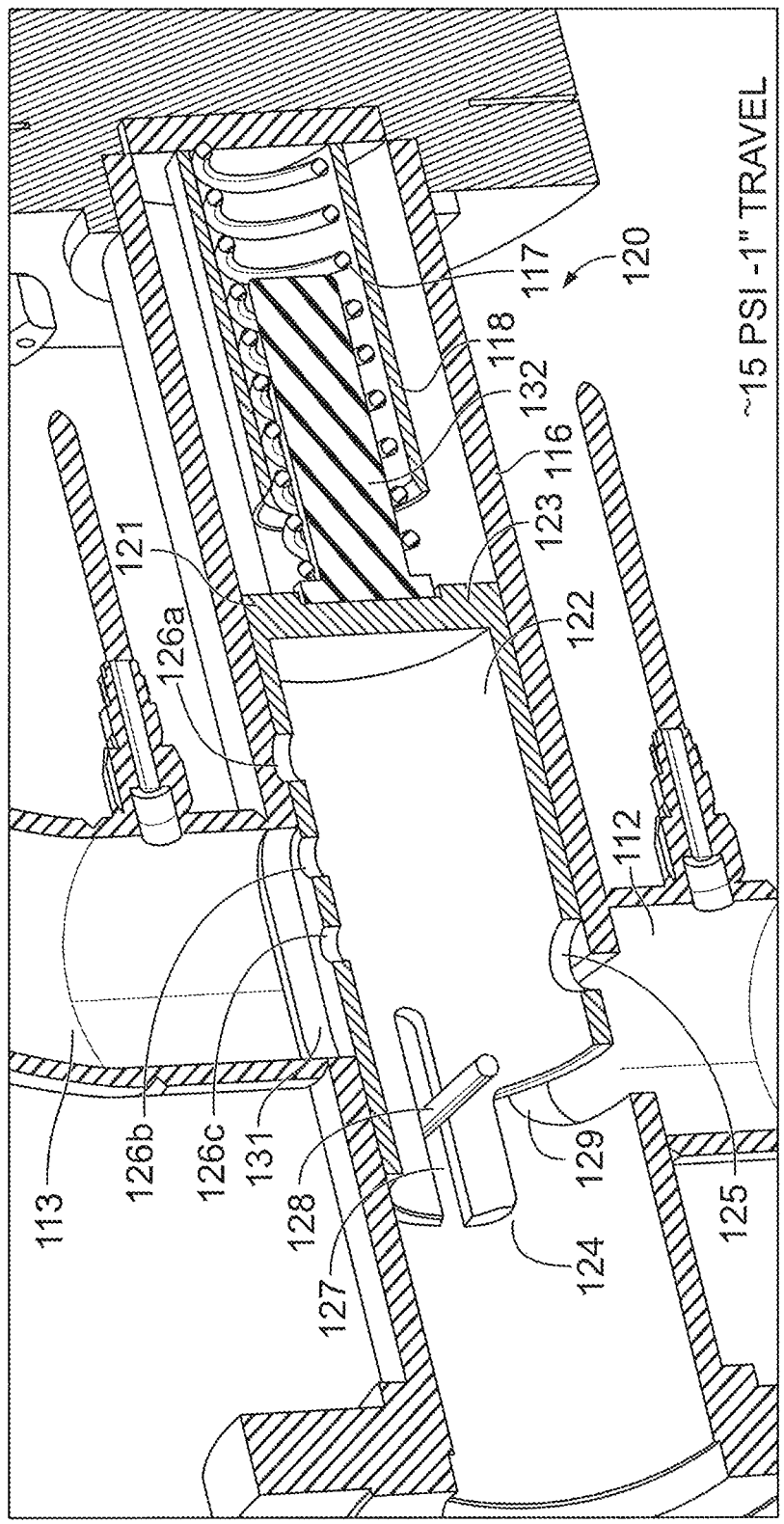
FIG. 2C is a cross-sectional diagram of a valve in the burner of FIG. 1 when the oxygen pressure is about 15 psi (103 kPa)

FIG. 2C shows a close-up diagram of the apparatus 100 when the oxygen pressure from the oxygen inlet 115 has increased to about 15 psi (103 kPa). The pressure in the piston 121 pushes against the piston 123 and moves the piston 121 against the compression spring 117 even further than as shown in FIG. 2B. In this exemplary and illustrative embodiment, the pressure has induced the piston 121 to move about 1 inch (2.5 cm). In other embodiments, the different pressures and distances of movement may be used. As shown, the first shroud port 126a is now completely cut off from the shroud oxygen circuit 113, so the shroud oxygen circuit 113 is only being supplied through the second shroud port 126b and third shroud port 126c. The hollow piston wall 122 has shifted enough that the open end 124 allows oxygen to flow into the main oxygen circuit 112 through both the part of the opening 129 in the cylinder 116 exposed to the interior of the piston 121 and also through part of the main oxygen port 125. This middle mode or position is when more oxygen is flowing through the main oxygen circuit 112 than the shroud oxygen circuit 113.

Figure 2D:
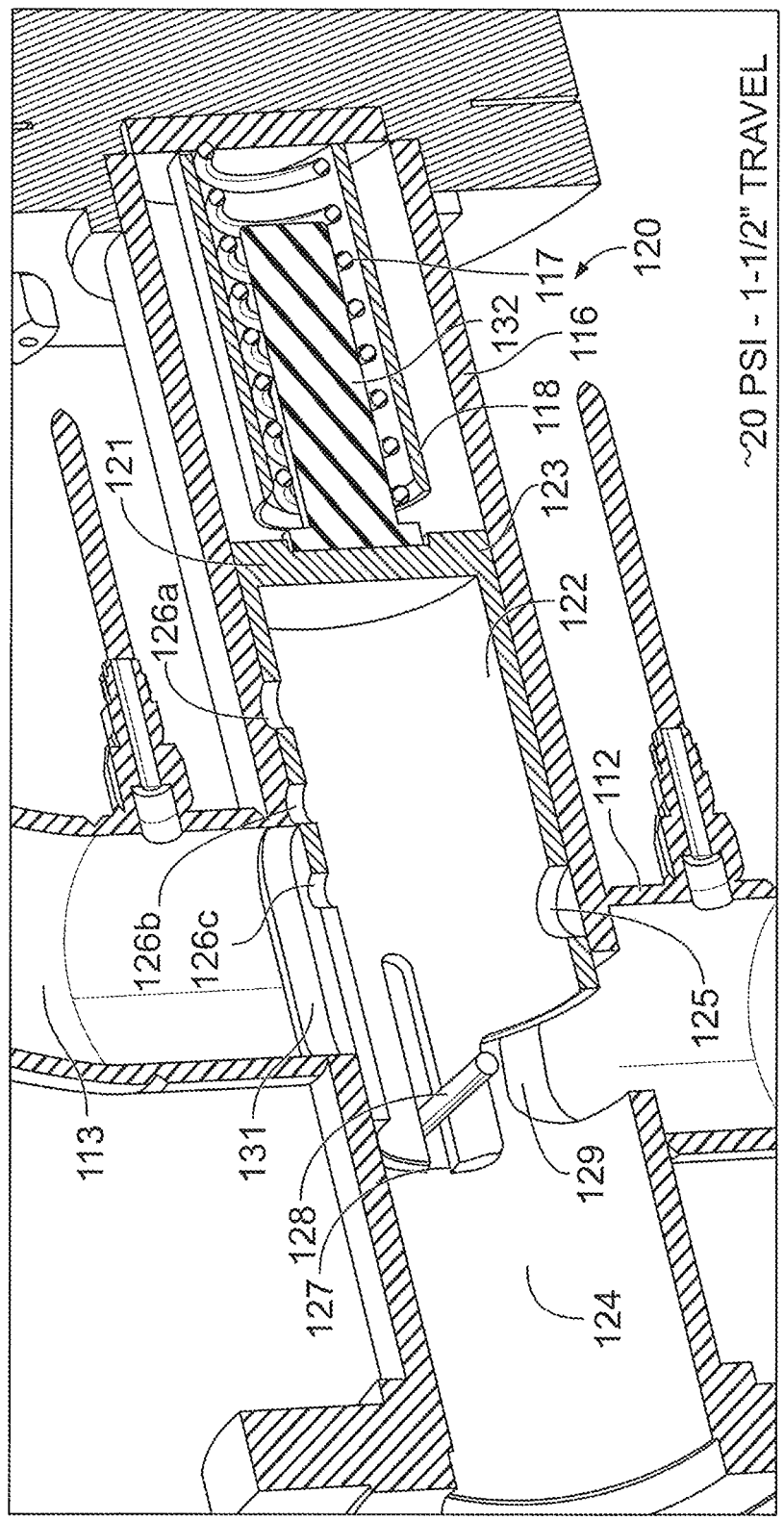
FIG. 2D is a cross-sectional diagram of a valve in the burner of FIG. 1 when the oxygen pressure is about 20 psi (138 kPa)
Figure 2E:
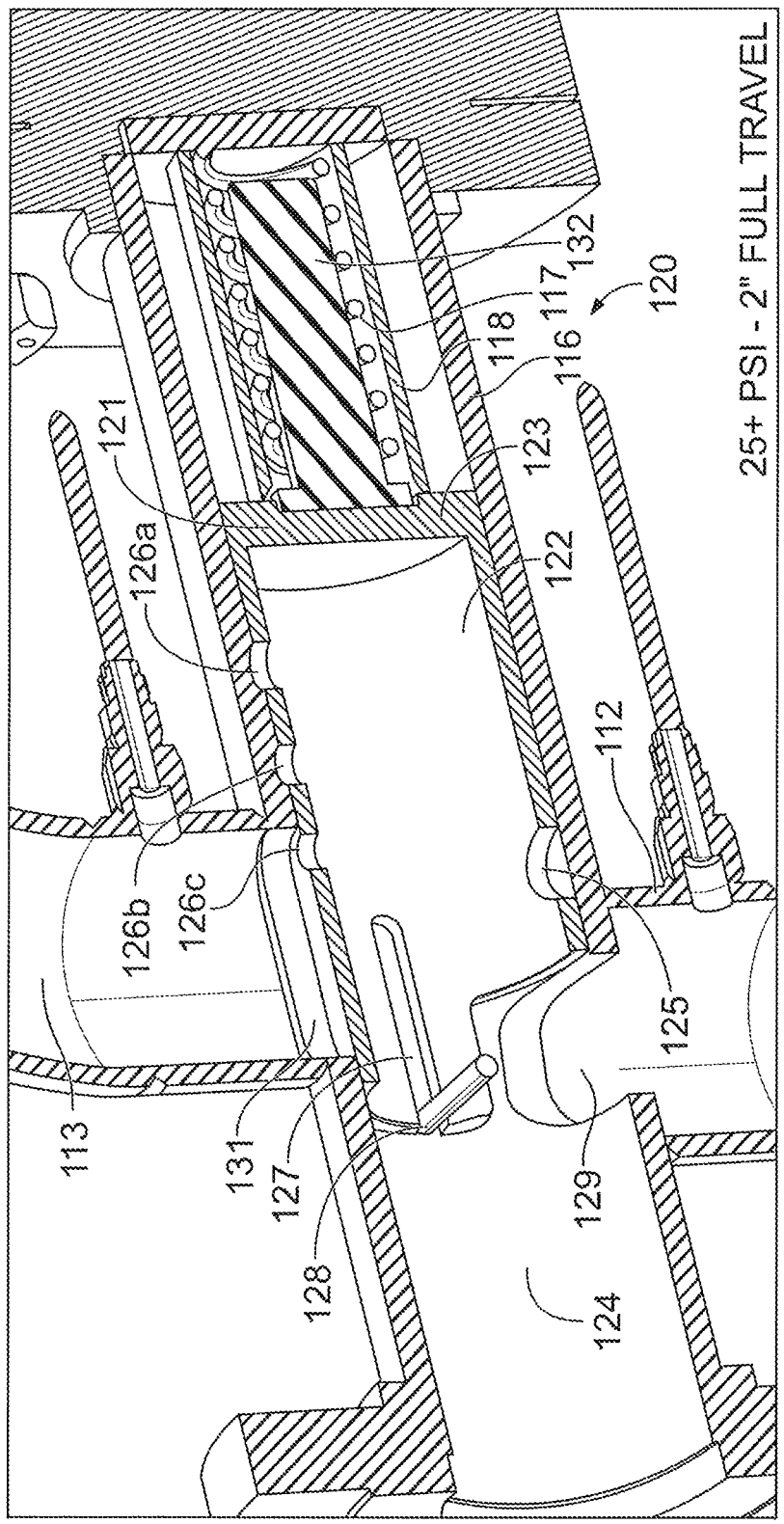
FIG. 2E is a cross-sectional diagram of a valve in the burner of FIG. 1 when the oxygen pressure is 25 psi (172 kPa) or higher.

FIG. 2D shows a close-up diagram of the apparatus 100 when the oxygen pressure from the oxygen inlet 115 has increased to about 20 psi (138 kPa). The pressure in the piston 121 pushes against the piston cap 123 and moves the piston 121 against the compression spring 117 and shifts the positions of the ports 125, 126 in the piston wall 122 relative to the openings 129, 131 in the cylinder 116. In this exemplary and illustrative embodiment, the pressure has induced the piston 121 to move about 1½ inches (3.8 cm). In other embodiments, the different pressures and degrees of movement may be used. As shown, the third shroud port 126c remains aligned with the opening 131 for the shroud oxygen circuitry 113; however, the first and second shroud ports 126a, 126b are completely blocked by the wall of the cylinder 116.

FIG. 2E shows a close-up diagram of the apparatus 100 when the oxygen pressure from the oxygen inlet 115 has increased to about 25 psi (172 kPa) or higher. The pressure in the piston 121 pushes against the piston cap 123 and moves the piston 121 against the compression spring 117 and shifts the positions of the ports 125, 126 in the piston wall 122 relative to the openings 129, 131 in the cylinder 116. In this exemplary and illustrative embodiment, the pressure has induced the piston 121 to move about 2 inches (5.1 cm). In other embodiments, the different pressures and degrees of movement may be used. As shown, the third shroud port 126c remains aligned with the opening 131 for the shroud oxygen circuit 113; however, the first and second shroud ports 126a, 126b is are completely blocked by the wall of the cylinder 116. As shown, the piston wall 122 is configured to allow flow from the hollow piston 121 into the main oxygen circuit opening 129 while blocking flow from the hollow piston 121 into the shroud oxygen circuit opening 131, except for through the port 126c. As would be understood by a person of skill in the art, the piston wall 122 may be modified to accommodate the positions, sizes, and shapes of the main oxygen circuit opening 129 and the shroud oxygen circuit opening 131. This high flow mode position (lance mode) is when only a small percentage of oxygen is flowing through the shroud oxygen circuit 113 and the rest is flowing through the main oxygen circuit 112. The small percentage of flow through the shroud oxygen circuit 113 should be maintained at a level to preserve a minimum velocity against plugging, as would be understood by a person of ordinary skill in the art.

Figure 3:
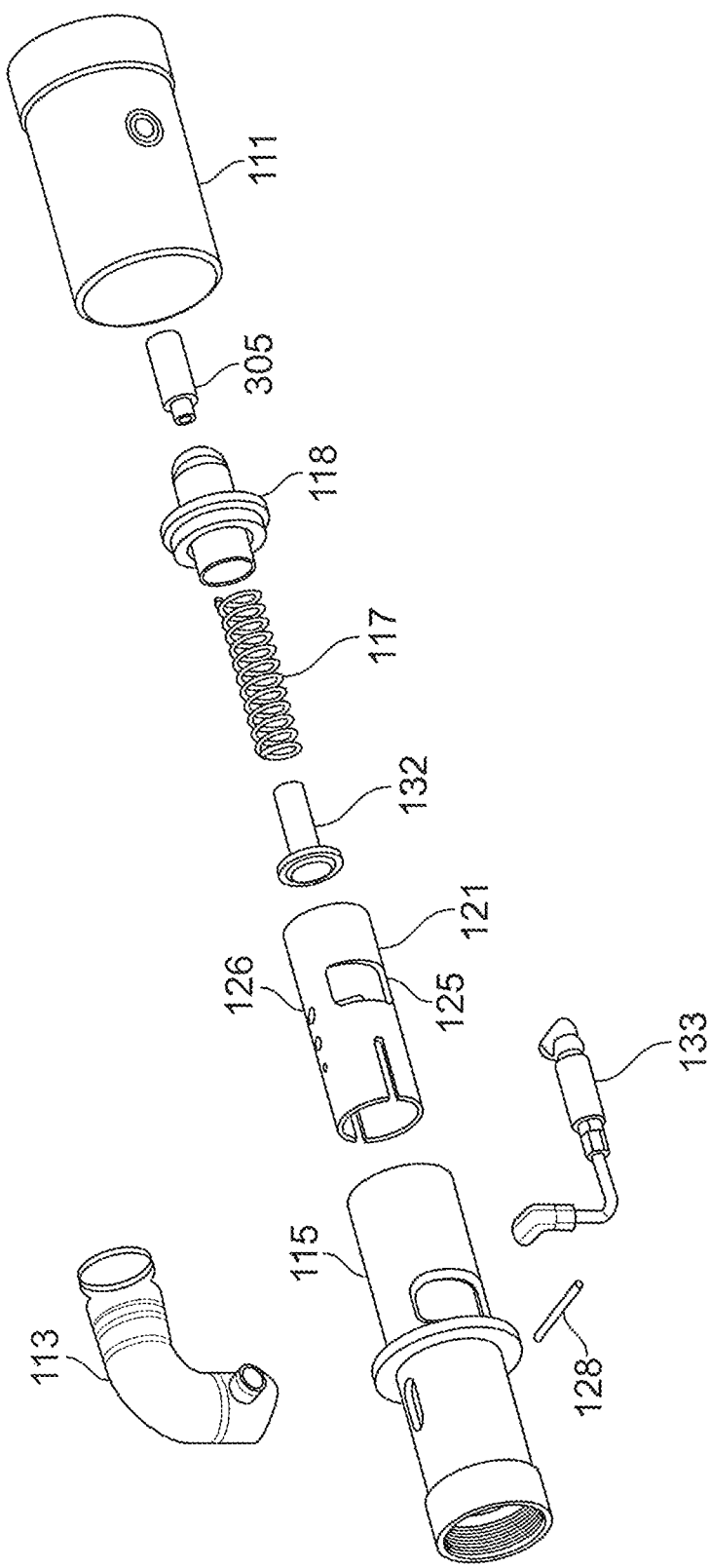
FIG. 3 is an exploded view of the apparatus of FIG. 1.

FIG. 3 shows an exploded view of part of the oxygen burner apparatus 100 from FIG. 1. In this view, the components of the valve 120 are shown. In this view, an optional check valve 305 is shown disposed with the spring housing 118.

Figure 4:
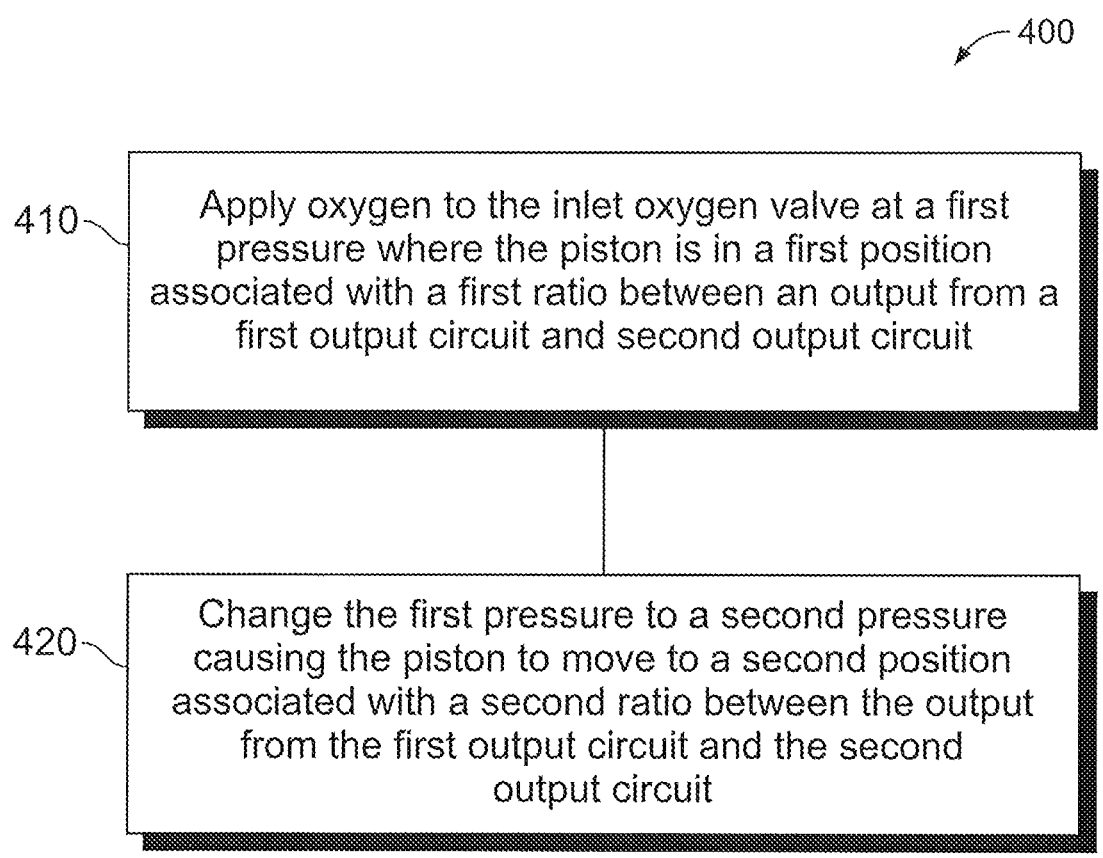
FIG. 4 is a flow chart of a method of supplying oxygen from a single inlet burner according to one embodiment of the present disclosure.

FIG. 4 shows a method 400 of regulating oxygen flow in a burner according to at least one embodiment of the present disclosure. In step 410, oxygen is applied through the oxygen inlet 115 at a first pressure associated with a first mode or first ratio between the flow in the main oxygen circuit 112 and the shroud oxygen circuit 113. In step 420, the oxygen pressure is increased/decreased to cause the piston 120 to shift position from a first mode to a second mode, where the second mode is associated with second ratio between the flow in the main oxygen circuit 112 and the shroud oxygen circuit 113.

In some embodiments, there may be a low flow mode, medium flow mode, and a high flow mode. In some embodiments, low flow mode may be at an inlet pressure of 10 psi (69 kPa) or less, medium flow mode may be at an inlet pressure of 15-20 psi (103-138 kPa), and high flow mode may be at an inlet pressure of 25 psi (173 kPa) or higher. These pressures and the number of modes (and corresponding ratios) are exemplary and illustrative only, as the method may be performed between any two modes or two or more modes (and corresponding ratios).

While the disclosure has been described with reference to exemplary embodiments, it will be understood that various changes may be made, and equivalents may be substituted for elements thereof without departing from the scope of the disclosure. In addition, many modifications will be appreciated to adapt a particular instrument, situation or material to the teachings of the disclosure without departing from the essential scope thereof. Therefore, it is intended that the disclosure not be limited to the particular embodiment disclosed as the best mode contemplated for carrying out this disclosure, but that the disclosure will include all embodiments falling within the scope of the appended claims.

What is claimed is:
1. A burner apparatus, the apparatus comprising:
a tubular body having a first end and a second end;
a first oxygen circuit disposed inside of the tubular body and having an outlet at the first end of the tubular body;

a second oxygen circuit attached to the outside of the tubular body, wherein the tubular body includes openings connected with the second oxygen circuit;
a valve disposed in the tubular body proximate to the second end of the tubular body, the valve comprising:
a hollow piston, comprising:
a piston wall having a first end and a second end; and
an end cap connected to the first end of the piston wall;
wherein the piston wall defines a plurality of piston ports;
a cylinder configured to receive the hollow piston, wherein the cylinder defines a plurality of cylinder ports aligned with an inlet of the first oxygen circuit and an inlet of the second oxygen circuit;
a biasing member in physical communication with the hollow piston and the tubular body and responsive to oxygen pressure applied at the second end of the tubular body; and
wherein, when the hollow piston is positioned at different points within the cylinder, one or more of the piston ports align with one or more of the cylinder ports.

2. The apparatus of claim 1, wherein the plurality of piston ports comprise one or more ports configured to align with the first oxygen circuit and one or more ports configured to align with the second oxygen circuit.

3. The apparatus of claim 2, wherein a combined cross-sectional area of the one or more ports configured to align with the first oxygen circuit is equal to a combined cross-sectional area of the one or more ports configured to align with the second oxygen circuit.

4. The apparatus of claim 2, wherein the one or more ports configured to align with the second oxygen circuit comprise two or more ports of equal cross-sectional area.

5. The apparatus of claim 1, the tubular body further comprising: a restraint member disposed on an inside of the tubular body; and the piston wall comprising a channel configured to receive the restraint member such that the restraint member limits the travel of the hollow piston to a selected distance from the second end.

6. The apparatus of claim 1, wherein the first oxygen circuit is a main oxygen circuit and the second oxygen circuit is a shroud oxygen circuit.

7. The apparatus of claim 1, wherein the biasing member is a spring.

8. The apparatus of claim 1, further comprising a gas tube connected to the tubular body to provide fuel to the burner apparatus.

9. The apparatus of claim 1, wherein the plurality of piston ports comprises at least three piston ports and the plurality of cylinder ports comprises at least two cylinder ports.

10. A method of controlling oxygen pressure in a burner apparatus, the burner comprising:
a tubular body having a first end and second end;
a first oxygen circuit disposed inside of the tubular body with an outlet at the first end;
a second oxygen circuit attached to the outside of the tubular body, where the tubular body includes openings connected with the second oxygen circuit;
a valve disposed in the tubular body proximate to the second end, the valve comprising:
a hollow piston, comprising:
a piston wall with a first end and a second end; and
an end cap connected to the first end of the piston wall;
wherein the piston wall comprises a plurality of piston ports;
a cylinder configured to receive the hollow piston, wherein the cylinder has a plurality of cylinder ports aligned with an inlet of the first oxygen circuit and an inlet of the second oxygen circuit;
a biasing member in physical communication with the hollow piston and the tubular body and responsive to oxygen pressure applied at the second end; and
wherein, when the hollow piston is positioned at different points within the cylinder, one or more of the piston ports align with one or more of the cylinder ports;
the method comprising the steps of:
applying oxygen to the valve at a first pressure wherein the hollow piston is in a first position associated with a first ratio between an output flow from the first oxygen circuit and an output flow form the second oxygen circuit; and
changing the first pressure to a second pressure causing the hollow piston to move to a second position associated with a second ratio between the output flow from the first oxygen circuit and the output flow from the second oxygen circuit.

11. The method of claim 10, wherein the first ratio is 50:50, and the first pressure is 10 psi (69 kPa) or less.

12. The method of claim 10, wherein the second ratio is 90:10, and the second pressure is 25 psi (172 kPa) or greater.

13. The method of claim 10, wherein the first position is about 2 inches (5.1 cm) from the second position.

14. The method of claim 10, wherein the first oxygen circuit is a main oxygen circuit and the second oxygen circuit is a shroud oxygen circuit.

15. The method of claim 10, wherein the biasing member is a spring.

16. The method of claim 10, further comprising a gas tube connected to the tubular body to provide fuel to the burner apparatus.

17. The method of claim 10, wherein the plurality of piston ports comprises at least three piston ports and the plurality of cylinder ports comprises at least two cylinder ports.

18. The method of claim 10, the method further comprising the step of changing the second pressure to a third pressure causing the hollow piston to move to a third position associated with a third ratio between the output flow from the first oxygen circuit and the output flow from the second oxygen circuit.

* * * * *